US007457831B2

(12) United States Patent
Orleth et al.

(10) Patent No.: US 7,457,831 B2
(45) Date of Patent: Nov. 25, 2008

(54) PERIPHERAL DEVICE DRIVER MAINTENANCE SCHEME FOR NETWORKED PERIPHERAL DEVICE CLIENTS

(75) Inventors: Robert E. Orleth, Bellevue, WA (US); Emil G. Antonov, Redmond, WA (US); Mikael P. Horal, Bellevue, WA (US); Timothy J. Lytle, Sammamish, WA (US); Tali Roth, Kirkland, WA (US); Albert L. Ting, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1258 days.

(21) Appl. No.: 10/403,788

(22) Filed: Mar. 31, 2003

(65) Prior Publication Data
US 2004/0215754 A1 Oct. 28, 2004

(51) Int. Cl.
*G06F 17/30* (2006.01)
(52) U.S. Cl. .................. 707/203; 717/170; 717/173; 719/321; 709/219; 709/220
(58) Field of Classification Search ......... 717/168–178; 719/321–327; 707/203; 709/217–222
See application file for complete search history.

(56) References Cited

U.S. PATENT DOCUMENTS

| | | | | | |
|---|---|---|---|---|---|
| 4,875,186 | A | * | 10/1989 | Blume, Jr. ..................... | 703/24 |
| 5,291,585 | A | * | 3/1994 | Sato et al. ..................... | 710/10 |
| 5,359,713 | A | * | 10/1994 | Moran et al. .................. | 710/52 |
| 5,479,612 | A | * | 12/1995 | Kenton et al. ................. | 726/5 |
| 5,485,460 | A | * | 1/1996 | Schrier et al. ............... | 709/227 |
| 5,580,177 | A | * | 12/1996 | Gase et al. .................... | 400/61 |
| 5,603,027 | A | * | 2/1997 | Ohkami ...................... | 707/200 |
| 5,715,455 | A | * | 2/1998 | Macon et al. ............... | 707/205 |
| 6,003,065 | A | * | 12/1999 | Yan et al. .................... | 709/201 |
| 6,362,892 | B1 | | 3/2002 | Lee et al. | |
| 6,477,544 | B1 | | 11/2002 | Bolosky et al. | |
| 6,598,169 | B1 | | 7/2003 | Warwick et al. | |
| 6,871,344 | B2 | | 3/2005 | Grier et al. | |

(Continued)

OTHER PUBLICATIONS

Author: Rick Anderson Title: the end of DLL hell☐☐Pertinent pages: 9☐☐Publisher: http://msdn2.microsoft.com/en-us/library/ms811694.aspx☐☐Date: Jan. 2000.*

(Continued)

*Primary Examiner*—Hosain T Alam
*Assistant Examiner*—Syling Yen
(74) *Attorney, Agent, or Firm*—Lee & Hayes, PLLC

(57) ABSTRACT

A network peripheral device driver maintenance framework and corresponding method is disclosed. The framework includes a driver version identification level comprising a set of driver version descriptions. Each driver version comprises a set of component versions that make upon each particular driver version. A driver component level, under the driver version identification level, comprises uniquely identified component versions (containers) comprising sets of driver files that make up the component versions identified by the driver versions. A method for maintaining multiple simultaneously active networked peripheral device drivers is disclosed. The method includes storing a new driver on the machine in a manner including the following steps performed by a machine. Initially, the machine establishes, within a directory structure, a container for storing a set of driver files constituting a version of a driver component. A unique identifier name is assigned to the new container. A set of driver files associated with the component version is inserted within the container.

11 Claims, 10 Drawing Sheets

U.S. PATENT DOCUMENTS

| | | | |
|---|---|---|---|
| 7,107,330 B1 * | 9/2006 | Hamilton et al. | 709/221 |
| 7,237,101 B1 * | 6/2007 | Dono et al. | 713/1 |
| 2002/0100017 A1 | 7/2002 | Grier et al. | |
| 2003/0014561 A1 * | 1/2003 | Cooper | 709/321 |
| 2003/0200355 A1 | 10/2003 | Warwick et al. | |
| 2004/0003390 A1 | 1/2004 | Canter et al. | |
| 2004/0210908 A1 | 10/2004 | Warwick et al. | |

OTHER PUBLICATIONS

Anderson, "The End Of DLL: Hell" retrieved on May 9, 2007 at <<http://msdn2.microsoft.com/en-us/library/ms811694(d=printer).aspx>>, Microsoft, Jan. 2000.

D'Souza, et al., Implementing Side-by-Side Component Sharing in Applications (Expanded), retrieved on May 9, 2007 at <<http://msdn2.microsoft.com/en-us/library/ms811700(d=printer).aspx>, Microsoft, Nov. 1999.

* cited by examiner

PERIPHERAL DEVICE DRIVER MAINTENANCE SCHEME FOR NETWORKED PERIPHERAL DEVICE CLIENTS

FIELD OF THE INVENTION

The present invention relates generally to networked computing systems. More particularly, the present invention relates to methods and computer system mechanisms for administering networked peripheral device clients in a network environment wherein client machines share peripheral devices (e.g., printer, scanner, multi-function peripherals, etc.). The network clients rely upon drivers, and associated driver components, loaded locally upon the client machines to communicate with the shared peripheral devices.

BACKGROUND OF THE INVENTION

One popular and economical way for utilizing printers and other peripheral devices within an enterprise including multiple distinct users/computers linked together on a network is to share the networked peripheral devices among the multiple distinct users/computers. Rather than providing a dedicated peripheral device for each client machine, networks leverage the inherent inter-machine communications capabilities of the networked client machines and servers to share peripheral devices among multiple users. Such sharing generally improves the degree of utilization of the peripheral devices and decreases the cost of providing the peripheral device services to the networked users.

Sharing peripheral devices by multiple networked clients presents the opportunity to provide access by each client to multiple instances of peripheral devices (e.g., printers) on the network, and the clients communicate with servers supporting the various peripheral devices through drivers. The peripheral device drivers generally comprise multiple components (e.g., files or combinations of files, also referred to as "assemblies") that, in combination, provide a complete driver. The drivers support various aspects of interactions between a client and a server for a peripheral device connection.

Managing peripheral device drivers in large networks comprising multiple peripheral devices shared by hundreds of users involves finding, storing, installing (activating), and updating drivers on the client machines. Driver management under such circumstances is not easily accomplished by an administrator physically going to each client machine and physically loading new drivers. Previously, in known "point-and-print" printer driver management arrangements, printer drivers were transferred on a file-by-file basis from a source to a target client machine. Such update mechanisms led to a number of problems including: installing incomplete packages of software for a given device; failing to preserve proper versions of driver files for particular peripheral devices during file updates; and generally failing to maintain consistency/compatibility between drivers loaded upon peripheral device servers and clients.

Peripheral device driver mismatches are a concern when a peripheral device is utilized in a client/server networked peripheral device environment. The client and server operate best when running the same version of a driver. However, if a client can only run one version of a driver at a time, then a driver mismatch can arise when a client interacts with two servers running different versions of a same driver. When the device drivers are installed on the client machine, only one version of driver files having a same name are stored on the client machine. In the case of file name overlap between two different driver versions, a client machine/user stores only one of the two same-named files (e.g., the file version bearing the more recent file creation date). As a consequence, complete client-server driver compatibility can only be assured for one of multiple active servers, operating differing versions of a driver, to which a client has a peripheral device connection. This, in turn, leads to impaired functionality with regard to a peripheral device server that executes a device driver version including one or more component versions that have been displaced by other driver component versions in an active driver directory. Displacement of active drivers can occur at any one of multiple levels on the client machine, including: (1) at a driver level where the components of one driver version differ from a second driver version; (2) at a driver component level where the contents of a component differ between versions; and (3) at a driver file level where the contents of two same-named versions of a file differ.

Examples of incompatibilities/impaired functions that can arise from overwriting versions of drivers/components/files include unsupported configuration features, operations, and user interfaces.

SUMMARY OF THE INVENTION

The present invention seeks to address many of the shortcomings of the prior art with regard to maintaining potentially different versions of drivers and their associated component versions on machines in a networked peripheral device environment. A method for maintaining multiple simultaneously active networked peripheral device drivers is disclosed. The method is performed, for example, by a networked machine to ensure compatibility, with all networked peripheral devices/servers, in situations wherein differing ones of the simultaneously active networked peripheral device drivers potentially contain differing peripheral device driver components and/or files bearing a same name.

The method includes storing a new driver on the machine in a manner including the following steps performed by the machine. Initially, the machine establishes a container for storing a set of driver files constituting a version of at least a component of a networked peripheral device driver. A unique identifier name is then assigned to the container. Thereafter the set of driver files is inserted within the container.

In accordance with another aspect of the invention, the machines maintain active drivers within a multi-level active network device driver access/storage framework. The framework includes a driver version identification level comprising a set of uniquely identified driver versions. At a second level, each uniquely identified driver version references a set of driver components constituting a version of a networked peripheral device driver. In an embodiment of the invention, the components comprise sets of files. The files that make up the driver component versions are stored in uniquely identified sub-directories assigned to the component versions. Such unique identification of driver components facilitates preventing a first version of a driver file from overwriting a second version of a driver file bearing a same name when a subsequent version of a component is loaded on a networked system's active driver storage.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE DRAWINGS

Figure 1:
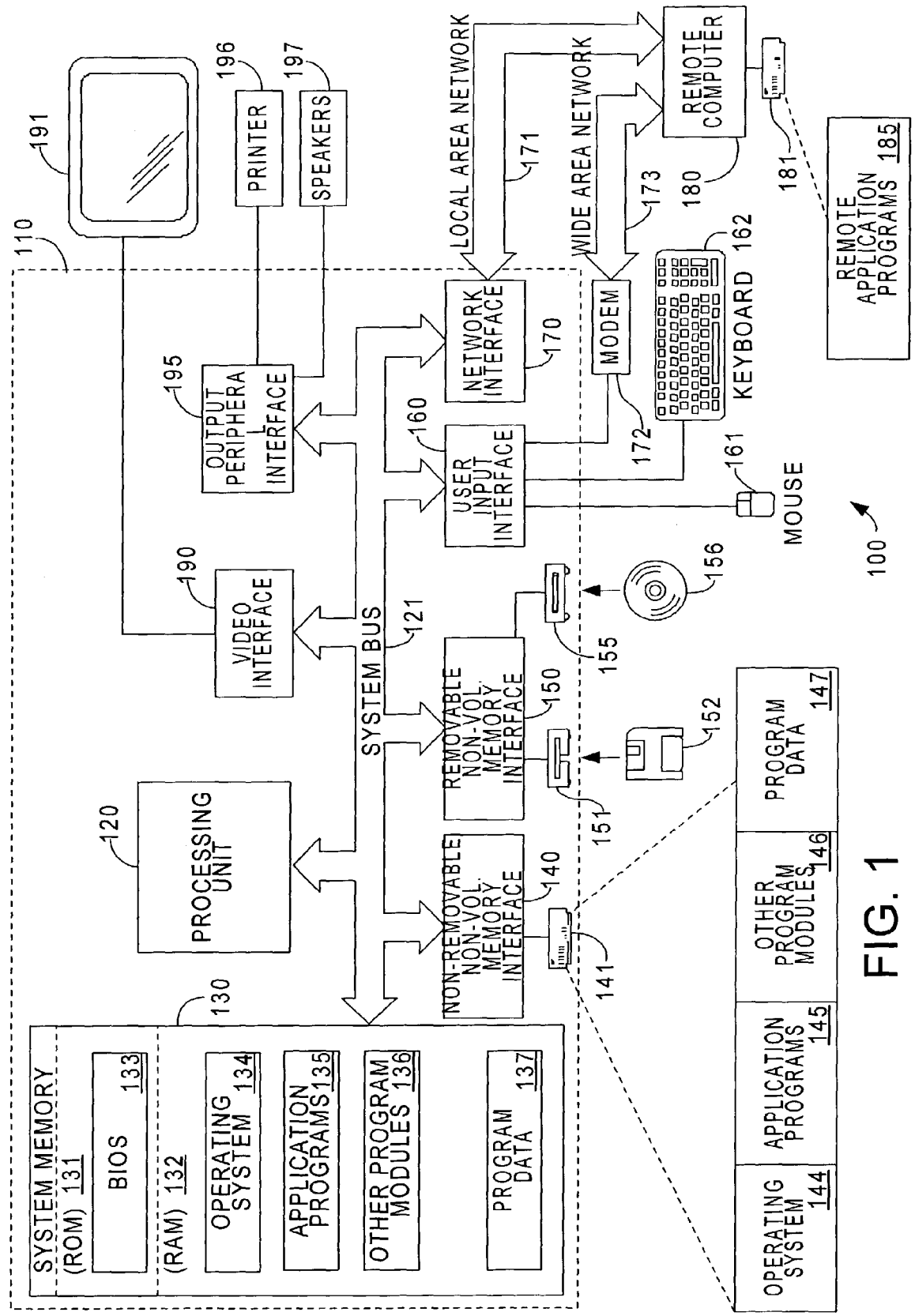
FIG. 1 is a block diagram depicting an exemplary computer system for carrying out an embodiment of the invention.

The present invention is embodied, by way of example, within a networked computer system environment including: clients, servers, and networked peripheral devices (e.g., printers, scanners, etc.). The present invention is carried out, for example, in a network including a centralized driver package store that operates as a point-source for installing peripheral device drivers onto requesting clients. The centralized driver package store maintains versions of complete driver packages including potentially multiple drivers/versions utilized by the clients to communicate with servers for the networked peripheral devices.

Furthermore, in an embodiment of the present invention, the completeness of packages installed on a driver package store is ensured. Completeness of drivers is ensured, by copying an entire set of files associated with a driver package when the package is installed on the centralized driver store, or any other machine, for later distribution to requesting client machines or installation of drivers from that package. There is no attempt to eliminate redundant files. Complete, non-selective, storing of all driver-related files in an installed package ensures that, when a client machine requests installation of drivers, the set of files associated with a particular requested driver will be both compatible and complete.

Yet another aspect of the driver storage and management scheme disclosed herein comprises a new manner for maintaining the active drivers on a system. In an embodiment of the invention, the sets of related files making up at least a portion of a unique driver version are maintained in a directory container having a unique identifier name. The unique identifier name, as referenced herein, provides a high degree of assurance that containers having a same identifier name are indeed identical. By grouping files making up at least a portion of a driver version under a unique identifier name, differing versions of drivers can be simultaneously activated on a client system.

The unique identifier name can come in a number of different formats. An example of such unique identifier name is a strong name as used in the context of .NET assemblies. Alternatively, suitable functionality can be gained by using a GUID+version combination to uniquely identify a certain version of a driver. Similarly, a GUID assigned to each version of a driver, could be used by itself as a unique identifier name. A GUID designating a version of a driver/file does not facilitate easy determination that two differing drivers/files are merely two versions of a same driver/file, and therefore using at least a driver/product GUID in combination with a version identifier is generally favored from the point of view of driver administration. In yet another embodiment, a security/authenticity segment (e.g., a hash of a public key) is added to the unique identifier name to facilitate authenticating the source of a particular driver or component/file thereof.

Use of unique identifier names to identify differing versions of drivers, containing differing constituent driver files, in accordance with the disclosed embodiments herein, enables client machines to simultaneously support peripheral device (e.g., printer) connections associated with servers executing differing versions of a same peripheral device driver. An example of such differing versions running on two different servers would be where two servers are utilizing differing versions of a driver DLL file having a same name. Rather than overwriting one of the two driver DLL files, the present invention contemplates storing each of the two differing DLL files in its own uniquely identified directory.

In an exemplary embodiment of the invention utilizing .NET assembly conventions, when a version of driver for a shared peripheral device is initially stored upon the centralized driver store, a strong name is determined for the particular version of the driver. The strong name is provided, for example, by the driver author. Alternatively, in cases where the driver is authored without knowledge of the particular driver storage infrastructure/method described herein, a suitable unique identifier name is generated, when the driver is stored, based upon metadata (e.g., a version number, a timestamp, checksum, etc.) extracted from one or more files associated with the particular driver version. A strong name has a very high likelihood of differing in the case of two non-identical files—thereby ensuring to a high degree of certainty that two files having a same strong name are indeed identical. The strong names, assigned to each of the various version containers, enable the centralized driver store and recipients of the drivers (e.g., printer clients) to distinguish a driver component (e.g., assembly) version from other versions that are potentially already stored on the machine.

In a particular embodiment of the invention, a metadata store maintains information related to installed packages and drivers in a compact format. The compact format (e.g., a database) facilitates easy lookup at a later time when a client requests installation/activation of the driver through any suitable peripheral device driver installation method (e.g., point-and-print).

In the disclosed embodiment of the invention, peripheral device driver clients store at least portions (components of) drivers in driver version-specific containers. When a particular driver is placed within a client machine's active driver store, it is assigned a unique identifier name (e.g., a strong name). As explained above, the strong name ensures that the particular version of the driver is readily distinguished from other versions of the same driver currently maintained by the client (the inclusion of version information also facilitates decision making based, for example, on which driver is newer). Once a particular driver version is activated on a recipient client machine, the strong name assigned to the particular driver version facilitates distinguishing the driver version from other activated versions of the same driver on the client.

In contrast to client-side driver management/storage schemes that potentially overwrite previous versions of driver files having a same name as the ones being copied into a driver directory during driver installation, the client-side driver management/storage scheme embodying the present invention ensures that a client driver management facility is able to distinguish various versions of drivers and their associated component/files. For example, when a newer version of a driver is installed on a client machine from the centralized driver store, the client creates a uniquely identified container (e.g., file system sub-directory) within its driver file storage facilities for at least the new components associated with the newer driver version. In an embodiment of the invention, rather than storing the complete set of driver components under a new directory, only new component versions are stored within new containers having unique identifier names to distinguish between versions of a same driver component. A previously installed older version of the same driver component remains, unchanged, in its own uniquely identified container. As a consequence, a networked peripheral device (e.g., printer) client, is capable of simultaneously supporting access to two distinct networked device servers that are currently running two different versions (e.g., 1.1 and 1.2) of a networked printer driver.

Turning to the drawings, FIG. 1 illustratively depicts an example of a suitable operating environment 100 for carrying out the centralized driver package store, peripheral device clients and servers in a shared network peripheral device environment incorporating the present invention. The operating environment 100 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, laptop/portable computing devices, hand-held computing devices, multiprocessor systems, microprocessor-based systems, network PCs, minicomputers, mainframe computers, distributed computing environments that include any of the above systems or devices, and the like.

The invention is described in the general context of a set of steps and processes carried out by computer-executable instructions, such as program modules, being executed by a computer. Generally, program modules include routines, programs, objects, components, data structures, etc. that perform particular tasks or implement particular abstract data types. Though the exemplary embodiment is described with reference to locally executed processes on a single computer system, the invention is potentially incorporated within network nodes operating in distributed computing environments where tasks are performed by remote processing devices that are linked through a communications network. In a distributed computing environment, program modules are generally located in both local and remote computer storage media including memory storage devices.

With continued reference to FIG. 1, an exemplary system for implementing the invention includes a general purpose computing device in the form of a computer 110. Components of computer 10 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Accelerated Graphics Port (AGP), Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is sometimes stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. In addition to the monitor 191, computers may also include other peripheral output devices such as speakers 197 and printer 196, which may be connected through a output peripheral interface 190.

The computer 110 potentially operates in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means for carrying out the described peripheral device driver management scheme may be used.

Figure 2:
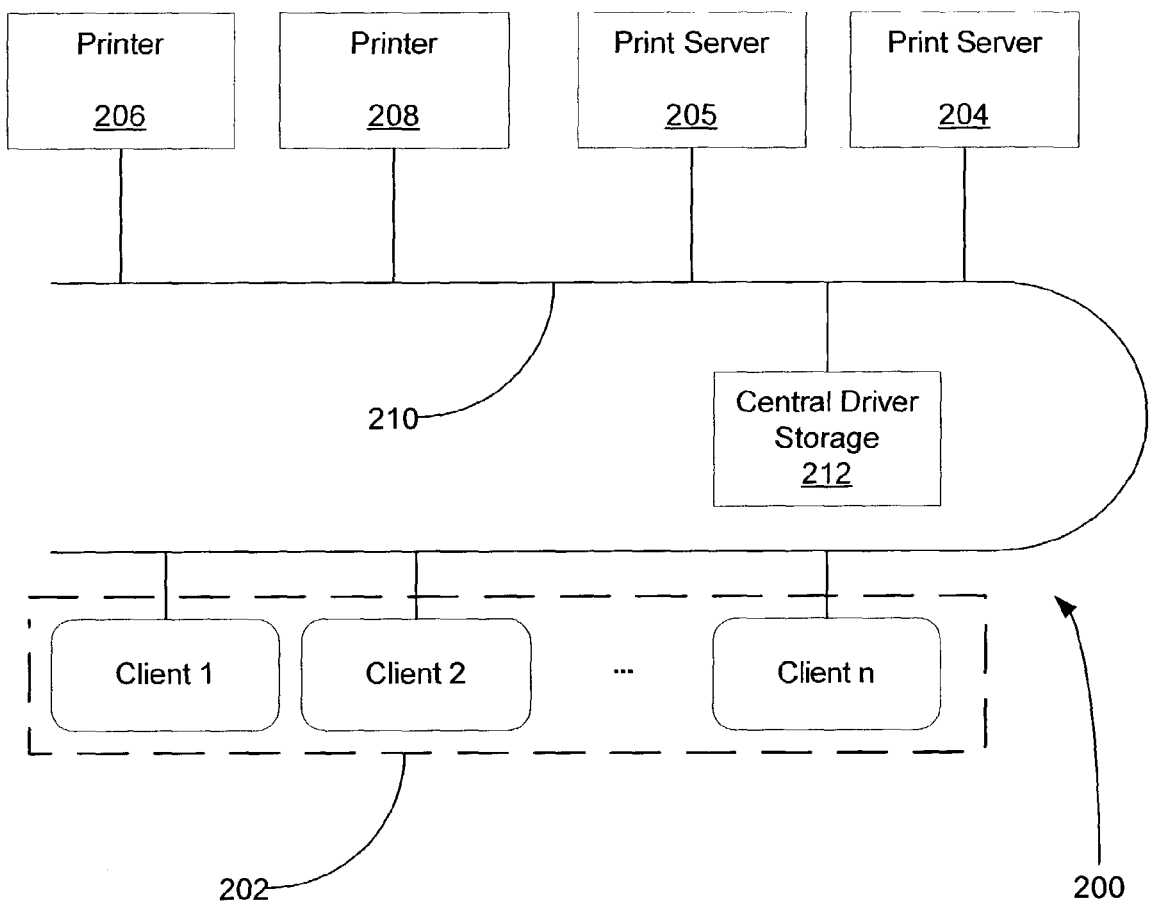
FIG. 2 is a high level schematic diagram depicting a representative network environment within which the present invention is advantageously incorporated.

FIG. 2 illustratively depicts an exemplary network including a set of network entities that participate in networked peripheral device (e.g., printer) driver management arrangement in accordance with an exemplary embodiment of the present invention. The exemplary computer network environment 200 includes a set of client machines 202(1-n) that execute application programs on behalf of logged on users. The number of client computers (n) is generally anywhere from a few computers to hundreds or even thousands. Such network conceivably includes wide area network links that open up the network to virtually any number of additional client machines. The client machines 202, through network printer drivers, configure print features (e.g., orientation, resolution, print mode, etc.) and submit print requests via a network link 210 to print queues maintained by print servers 204 and 205. The print servers 204 and 205 process the print requests using printer drivers corresponding to the printer drivers used by the client machines 202 to submit the requests to particular print queues. The print servers 204 and 205 utilize the printer drivers associated with the particular queues to render print jobs for appropriate printers corresponding to the print queues from which the print jobs were taken. Thereafter, the print servers 204 and 205 pass the rendered print jobs, via the network link 210, to an appropriate one (according to the clients' original print requests) of a set of networked printers 206 and 208 on behalf of the client machines 202. The printers 206 and 208 thereafter receive the rendered print jobs from the print servers 204 and 205, and the printers 206 and 208 generate printed document output.

A client computer of the client machines 202, in an embodiment of the invention, issues print requests after first installing and activating appropriate networked printer driver components associated with the print server (e.g., 204 or 205) to which its print requests are directed. In an embodiment of the present invention, such components are maintained within a centralized driver store 212 on the network 200 initially in the form of driver packages (discussed herein below with reference to FIG. 4a and 4b). The centralized driver store 212 renders drivers (including de-compressed components) and metadata from the packages. The metadata identifies the packages and the drivers (each comprising potentially many components/files) within the packages with sufficient detail to distinguish between: (1) different versions of a same package/driver, or (2) identically named files corresponding to different device drivers.

The client machines 202, in an embodiment of the invention, distinguish drivers—and the drivers' constituent files—stored in the active driver store 302 maintained by each of the client machines 202. In association with installing network device drivers from the centralized driver store 212 (or indirectly via any other network device containing a complete set of the components/files associated with a needed driver—such as one of the print servers 204 and 205) the client machines 202 create, for each distinct driver, a separate container (e.g., directory). A distinct label assigned to each driver container is rendered, at least in-part, from signature information associated with the driver. Such signature information has a variety of forms in alternative embodiments of the invention.

The above described network environment sets forth an exemplary computer network environment within which the invention is advantageously incorporated. As those skilled in the art will readily appreciate, the present invention is applicable to a variety of instances where it is desired, if not necessary, for client's of networked peripheral devices to maintain multiple active drivers (including multiple versions of a same driver) having potentially overlapping constituent driver file names. Having described such exemplary network environment, the content of peripheral device driver packages, processing the packages, and distributing and maintaining the drivers extracted from the packages are discussed herein below in accordance with illustrative embodiments of the invention.

Figure 3:
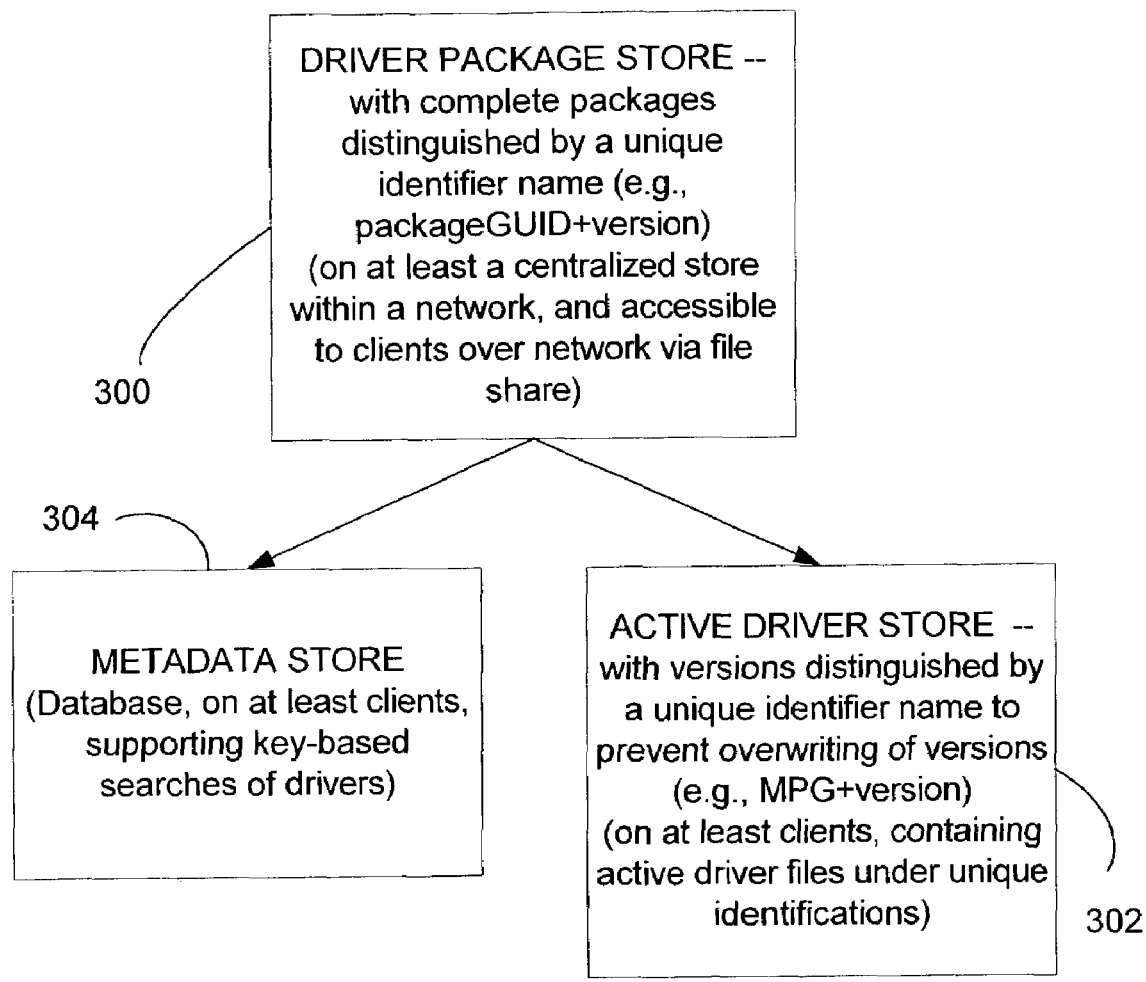
FIG. 3 is a schematic diagram illustratively depicting various driver-related software and information maintained on within servers and clients in an exemplary network embodiment of the present invention.

Turning now to FIG. 3, three representations of drivers and/or driver information in a driver storage arrangement are identified. A driver package store 300 stores complete copies of driver packages in the form that they are shipped by, for example, manufacturers. It is generally contemplated that the package will include multiple drivers supporting multiple computing environments and even different versions of essentially the same driver (e.g., sequential releases of a same driver including added/modified features and/or bug fixes). The driver package store 300, in an embodiment of the invention, is located on the centralized driver store 212. However, the driver package store 300, can be located on either a client machine or a server. In either case, in embodiments of the invention, the driver package store 300, is placed in a public directory (file share) in a distributed file system. To conserve space, the contents of driver packages are compressed. Components of an exemplary version of the driver package store 300 are described further herein below with reference to FIGS. 4a and 4b.

In an embodiment of the invention, driver files are extracted from packages in the driver package store 300 and placed within an active driver store 302. The active driver store 302, generally found on servers and clients in a network, is the directory structure for maintaining loaded, de-compressed, driver files. In an embodiment of the invention, the driver files of the active driver store 302 are maintained in a distributed file system share that is accessible by other client and server machines on a network. In such embodiment, the active driver store 302 on a client or server machine is isolated from other, non-public components within a machine's storage space. The form and function of an exemplary driver store 302 is described herein below with reference to FIGS. 5a and 5b.

In an embodiment of the network peripheral device driver maintenance framework, a metadata store 304 comprises a database supporting key-based arrangement and searching of drivers loaded on and/or available to a local machine. The metadata store 304, in an embodiment of the invention also includes, for each driver version, a manifest that lists a set of components that make up the particular driver version. Examples of key-searchable fields, by way of example, include: environment, manufacturer, driver, and package. An exemplary database schema is described herein below with reference to FIG. 6.

Figure 4A:
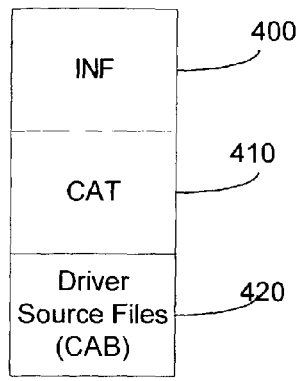
FIG. 4a is a block diagram depicting exemplary components of a single driver package in an embodiment of the invention.

Turning to FIG. 4a a driver package in the driver package store 300 can take a variety of forms. However, in an illustrative embodiment, the driver package includes three primary parts: an INF file 400, a CAT file 410, and driver source files compressed and placed into a CAB file 420. The INF file 400 describes the contents of the driver package. In an embodiment of the invention, the INF file 400 includes a unique ID identifying a package by package ID and a version—facilitating distinguishing between versions of a same driver package. The version, by way of example, is designated by a timestamp (year/month/date) inserted within a driver version field of the INF file 400. Alternatively, the unique ID for a particular package version is generated from hashing signature information within the CAT file 410 or even the CAB file 420. In yet other instances the version is a formalized version code comprising multiple segments identifying major/minor versions and bugfix releases. As evidenced by the number and variety of suitable version identifying information, the present invention contemplates using package-related data/ metadata that provides a high degree of certainty that two packages having identical version values are indeed the same package. Such identification is referred to herein as a "strong name."

The INF 400 includes directions to an installer to access the CAT file 410 in the driver package. The CAT file 410 includes a unique signature authenticating the package. The CAT file 410 also includes, by way of example and not limitation, metadata identifying the platforms for which the signature is valid and certificates that were used to create the signature. In addition to identifying the CAT file 410, the INF file 400 describes how to arrange files within the driver package to render one or more driver assemblies—a group of related files that make up a particular driver version. The INF also includes a plug-and-play ID. In an embodiment of the invention, the actual driver files are provided in compressed form in a CAB ("cabinet") file 420.

The following is a simple example of the INF file 400.

```
[Version]
PackageID={packageGUID}    ; identifies the package content
DriverVer=mm/dd/yyyy       ; identifies the revision (distinguishes
this version from other versions of package)
[Manufacturer]
%FooCorp%=Foo, NT.5.1, NT.6.0 ; these are TargetOsVersion IDs
[Foo]
;Win2k section
CopyFiles=@unidrv.dll, . . .
[Foo.NT.5.1]
<XP(NT 5.1) section, not necessarily different from W2k, if
indistinguishable from W2k, then can be left out>
[Foo.NT.6.0]
; NT 6.0 section, ignored by previous operating system versions
InstallPackage = InfName ; a referenced INF, relative to current dir
Manifest=foo.manifest
```

The exemplary INF includes directions for three distinct operating systems. The third one (Foo.NT.6.0) takes advantage of added mechanisms relating to loading files from a package. "InstallPackage" identifies an INF for another package that should be installed along with the current package. Components (of which .NET assemblies are a particular example) are the building blocks of drivers, and can comprise multiple files and even other components. The Manifest contains the strong name of the driver, and the strong names of the driver components (e.g., .NET assemblies).

In an embodiment of the invention, a package containing only Unidrv is supported, and the INF conveys that information. In an embodiment of the present invention, these needs are accomplished by a section tag [PrintSoftwareComponents] that includes "CompName"=CompGUID. Every component is described in a section named CompGuid.

For example:

[CompGuid]

CopyFiles=@Unidrv.dll, etc.

DriverVer=mm/dd/yyyy; optional, needed if different from [Version] section

Packages are stored in the driver package store 300 at a configurable location. By default, the driver package store resides upon a local machine (e.g., the centralized driver store 212). However, in an embodiment of the present invention, the contents of the driver package store 300 are made accessible to other networked machines. Such accessibility is achieved, by way of example by placing the package store 300 on a distributed file system share that is published to other machines on the network.

Figure 4B:
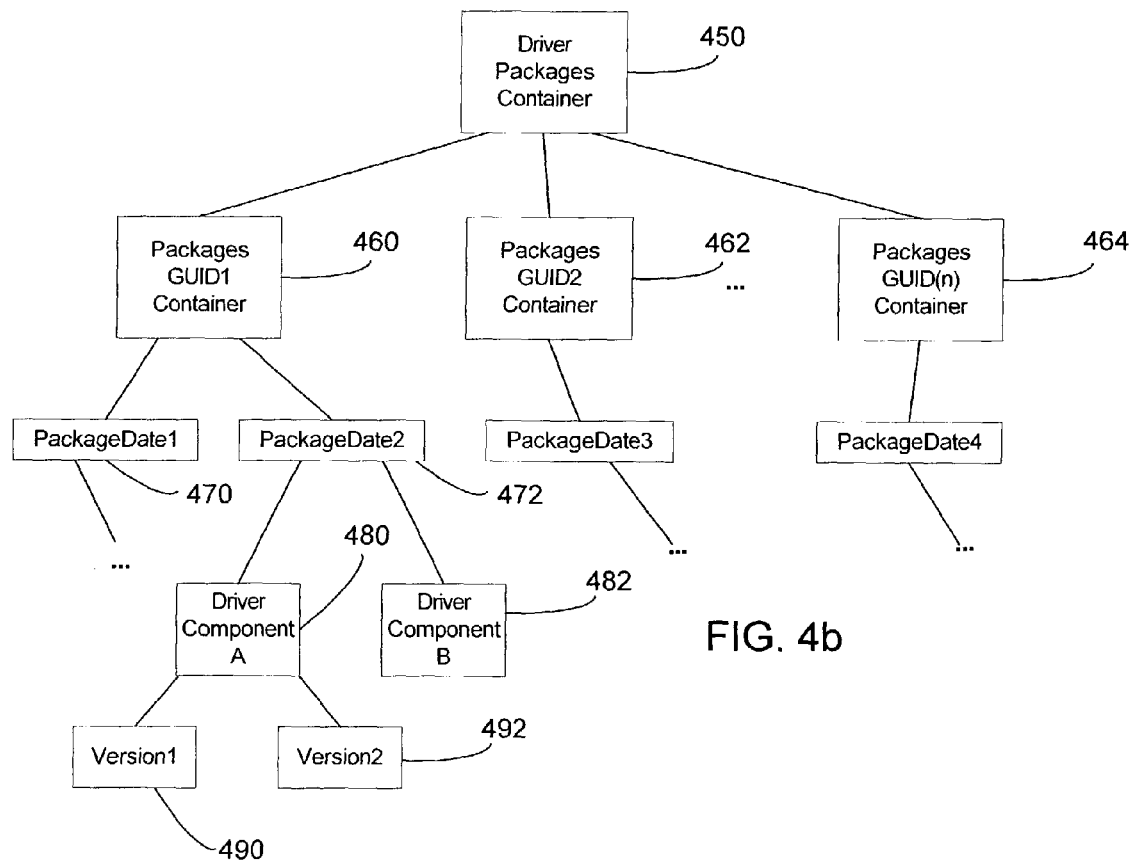
FIG. 4b is an exemplary hierarchical tree diagram illustratively depicting the multiple levels for organizing and distinguishing between versions of drivers and their packages from which they are extracted.

Turning to FIG. 4b a hierarchical tree diagram depicts the hierarchical arrangement/association of driver containers (e.g., packages, drivers, assemblies, etc.) and files within the driver package store 300—as specified by the INF file 400. It is noted that in the case of a file that is used multiple times in different driver assemblies, a single copy is potentially stored within the package and links are stored within the package to the single driver copy to conserve memory. Alternatively, a complete copy of a file is stored for each assembly with which it is associated.

At the highest level of the shared driver package store 300, a driver packages container 450 corresponds to a root of a shared directory. At a next level, a set of packageGUID-delimited package containers 460, 462 and 464 hold potentially multiple versions of uniquely identified packages (differentiated by a distinct GUID for each package). In the exemplary embodiment, the package container 460 holds two packages 470 and 472—each uniquely identified in the directory structure represented in FIG. 4b by a strong name (e.g., package date) assigned to each particular package version. In an embodiment of the invention, wherein the GUID+version approach is used rather than strong names, the hierarchical tree depicted in FIG. 4b, corresponds to the following directory arrangement:

| | |
|---|---|
| Root\{PackageGUID1}\PackageDate1\ | : contains one version of a first package |
| Root\{PackageGUID1}\PackageDate2\ | : contains newer version of first package |
| Root\{PackageGUID2}\PackageDate3\ | : contains version of second package |
| ... | |
| Root\{PackageGUIDn}\PackageDate4\ | : contains version of nth package |

In an embodiment of the invention, the package date format is yyyymmdd. In yet other exemplary embodiments, strong names or even GUID values alone are used to identify/distinguish driver package versions.

Furthermore, as depicted in FIG. 4b, in addition to containing non-driver component specific files such as driver manifests specifying the components making up particular driver versions (identified by a unique identifier name), the package 472 specifies driver component-specific containers 480 and 482 for driver component A and driver component B, respectively. Alternatively, each driver is given its own container (however this is less desirable in cases where components are common to many different drivers in a package. In an embodiment of the invention, driver component-specific containers 480 and 482 are specified by a combination of a model-and-provider GUID (MPG) that distinguishes driver components having a same name that are distributed by, for example, different driver software providers. The driver component-specific container 480 (Driver A), in turn comprises two version containers (e.g., assemblies) 490 and 492 corresponding to versions 1 and 2 of the driver component A. An assembly, in an embodiment of the present invention, contains a set of one or more files grouped together to carry out the driver's functionality.

In the exemplary embodiment of the present invention, at least a portion of a driver version (e.g., a component), that distinguishes the driver version from other driver versions, is stored in a separate and distinctly labeled container. This arrangement enables a networked peripheral device client to support multiple, distinct versions of a driver. In a particular embodiment of the invention, files making up a particular version of a driver component are grouped together in the form of assemblies. Each assembly is assigned to a distinctly labeled container (e.g., directory service sub-directory) such that assemblies associated with different versions of a same driver are assigned differing labels.

The driver component (e.g., assembly) versions are distinguished by labeling each driver assembly container with a unique identifier name—i.e., any suitable identifier that achieves a high likelihood of distinguishing between two differing versions of a particular driver. In a particular exemplary embodiment, the unique identifier names are .NET strong names. The strong names comprise version dates assigned to the group of related driver files (e.g., an assembly) that make up at least a portion of the particular driver versions. Alternatively, the version is provided in the form of a 64-bit value that is displayed in the form of a.b.c.d—where a.b. stands for the feature version number, and c.d. stands for the bugfix number. In yet other embodiments, the strong names are based upon a checksum or hashing operation performed on information distinguishing the driver version from other driver versions.

Figure 5A:
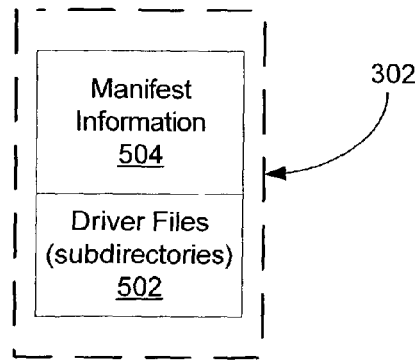
FIG. 5a is an exemplary active driver directory organization structure comprising a manifest and a set of sub-directories corresponding to each of the drivers installed within the active driver directory.

Turning to FIG. 5a, the active driver store 302, generally found on servers and clients in a network, is a directory structure that maintains loaded, de-compressed, driver files 502 and manifest information 504. In an embodiment of the invention, two types of manifests are used: (1) a component manifest describes a component's contents (e.g. identifies the files that make up a component, and any other needed components), and (2) a driver manifest describes the driver's components (only the components that are needed and not any file information as the driver itself doesn't have any files that are not part of a component). In an embodiment of the invention, each version of each driver component is allocated its own uniquely identified container (e.g., a sub-directory) within the active driver store 302. Furthermore, the active driver store 302 includes manifest information 504 per component that describes/enumerates groups of files associated with each particular driver component version (container) maintained in the active driver store 302.

In an embodiment of the invention, the manifest information 504 also includes lists within files labeled by unique identifiers (for each driver version) that identify the components in the active driver store 302 that make up the driver versions. Each particular driver version is provided its own uniquely identified container (e.g., a file) that contains only the driver manifest (not other files) enumerating the driver version's components. The driver manifest containers (files), in an embodiment of the invention, are located within the active driver store 302, or, in alternative embodiments, in some other appropriate location (including a driver version table in the metadata store 304). The unique identifier name for each driver/component container is, by way of example, a unique name that is created based upon any combination of characteristic data extractable from the driver/component versions to ensure that two differing versions of a same driver/component will have differing container names. As mentioned previously herein above, examples of such unique identifier name are: (1) a strong name, and (2) a model-and-provider GUID (MPG) and version combination.

In an embodiment of the invention, component descriptions, containing versioning information for setting a context for a particular driver, are stored in the manifest information 504 at the time of storing a particular driver component version in the active driver store 302. Thereafter, a service or application using a particular driver sets a context based on the manifest information 504 before loading the driver component files. The context (a.k.a. "activation context") is a data structure in memory containing information that the system can use to redirect an application to load a particular file version/assembly. It is created from the manifest file of the driver, in this case. The context defines which of the potentially many versions of files (e.g., DLLs) should be used for a particular driver version. The context can be overridden by, for example, an administrator.

The following represent two manifest information 504 entries for two versions of a particular driver component/assembly (comprising two related files) assigned to two distinct sub-directory containers in the driver files 502 of the active driver store 302.

Assembly 1: Foo.dll (v x.y)
    Fooui.dll (v a.b)
Assembly 1': Foo.dll (v x.y')
    Fooui.dll (v a.b')

Assembly 1' has a different version of both Foo.dll and Fooui.dll. In an embodiment of the invention, any differences between two sets of files of a particular driver component results in establishing distinct components (assemblies) having their own distinct manifests corresponding to sub-directories in the driver files 502.

In an embodiment of the invention, the driver files 502 of the active driver store 302 are maintained in a distributed file system share that is accessible by other client and server machines on a network. In such embodiment, the active driver store 302 on a client or server machine is isolated from other, non-public components within a machine's storage space. The arrangement of the driver files 502 in the distributed file system share corresponds to the assemblies identified by the manifest information 504.

Figure 5B:
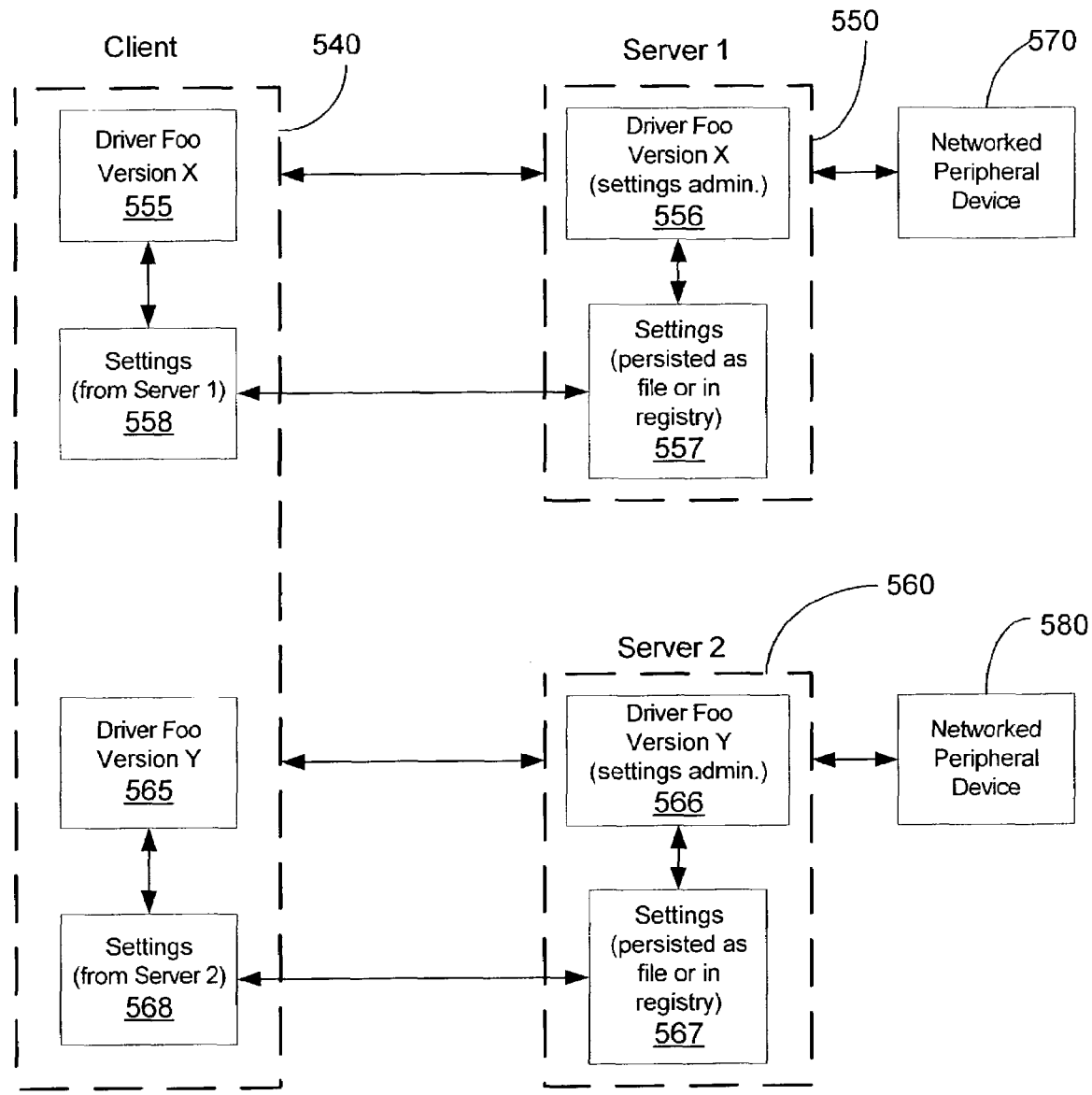
FIG. 5b illustratively depicts an exemplary network peripheral device arrangement where a single client is able to support simultaneous compatibility with two servers running different versions of a same driver.

Turning to FIG. 5b, a diagram illustratively depicts an exemplary instance wherein the present invention is particular valuable—i.e., when a client 540 maintains two different connections to a first server 550 and a second server 560 that are running two different versions ("x" and "y") of a same driver ("Foo"). In the illustrative case, the client 540 exploits its ability to maintain both a version x of driver Foo 555 and a version y of driver Foo 565 simultaneously active, in order to achieve complete simultaneous compatibility with both server 550 (running driver version x 556) and server 560 (running driver version y 566) when handling peripheral device settings associated with corresponding networked peripheral devices 570 and 580. Such settings are persisted at settings 557 and 567 in servers 550 and 560, respectively. A copy of the persisted settings 557 and 567 are respectively copied into the settings 558 and 568 maintained on the client 540. Failure to maintain complete driver version compatibility introduces a potential inability of the client 540 to interpret the settings 558 and 568 on the servers 550 and 560.

Figure 6:
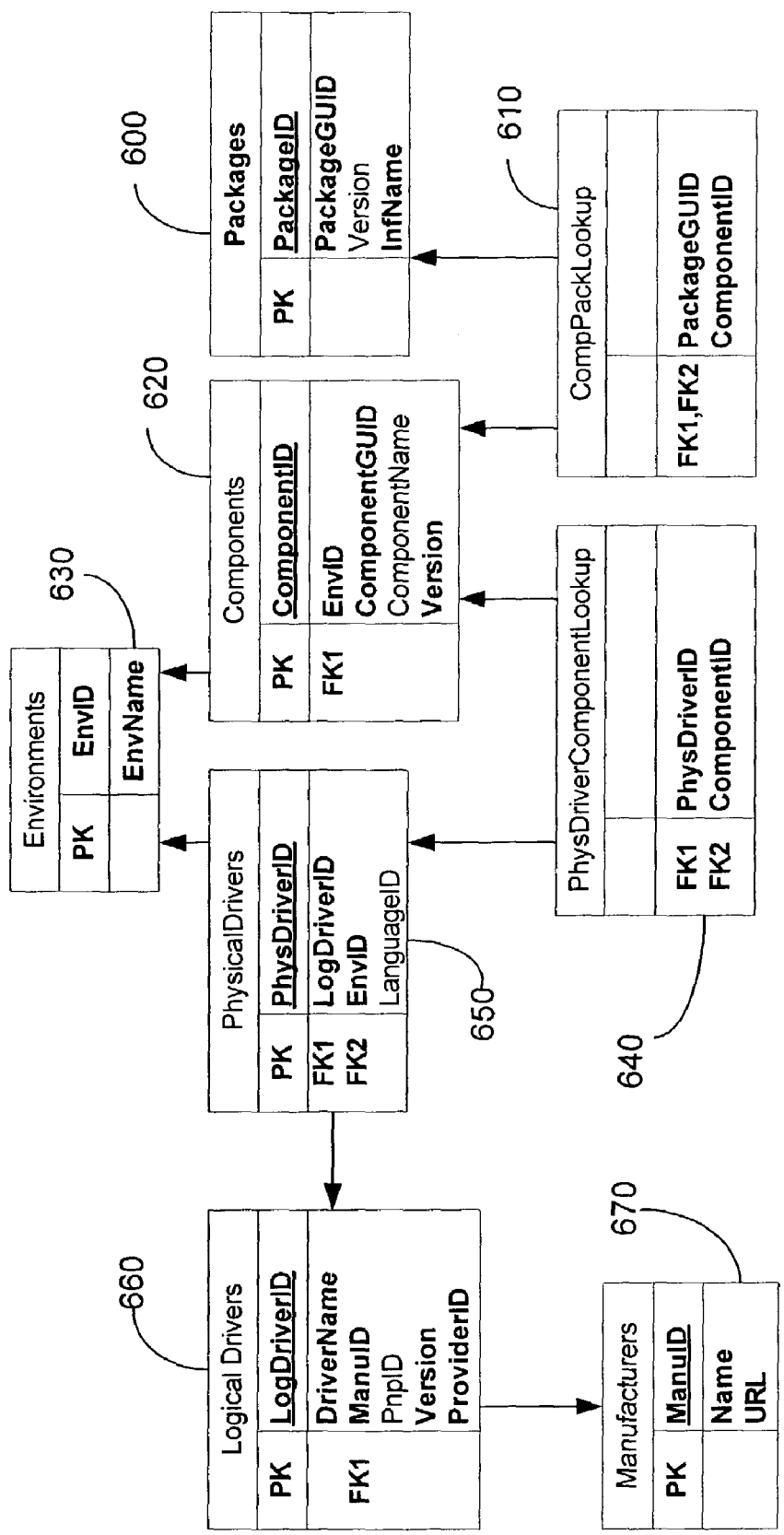
FIG. 6 is an exemplary database schema for the metadata store.

Turning to FIG. 6, a database schema depicts an exemplary arrangement of the metadata store 304 of an exemplary driver management facility. As mentioned previously herein above, the metadata store 304 is maintained upon at least a client machine and summarizes in an orderly manner the loaded, active drivers on the machine. The metadata store 304 is not required to carry out the present invention. However, its presence offers a convenient way to administer large collections of peripheral device drivers in a network environment. In an embodiment of the invention, the metadata store 304 is administered by a spooler service.

The exemplary database schema summarized in FIG. 6 is arranged/accessed as follows. Entries within a Packages table 600 are referenced by a CompPackLookup function 610 by submitting a "PackageID". The sub-fields provided for entries within the Packages table 600 include a packageGUID, version, and INFName for each identified package.

The CompPackLookup function 610 also accesses entries within a Components table 620 through a "ComponentID". When components are enumerated, they include an EnvID, ComponentGUID, ComponentName, and Version. The EnvID field provides a value that can be used as a search key on an Environments table 630. The Environments table 630 entries include a corresponding EnvName for the identified Environment (e.g., Windows NT x86, Windows NT IA64, etc.).

Another contemplated table entry search function is a PhysDriverComponentLookup function 640. The PhysDriverComponentLookup function 640 accessed entries in the Components table 620 through the ComponentID search key. The PhysDriverComponentLookup function 640 also accesses a PhysicalDrivers table 650 through a PhysDriverID search key. When physical driver entries in the PhysicalDrivers table 650 are enumerated, they include a logical driverID, EnvID, and languageID. The EnvID field provides a value for searching the Environments table 630. Furthermore, the logical driver ID field provides a value for searching a LogicalDrivers table 660. In an embodiment of the invention, the PhysicalDrivers table 650 also stores the driver manifest lists for each uniquely identified physical driver/version combination.

Thus, in an embodiment of the present invention a logical driver refers to a driver abstracted from a compiled driver for a particular platform or localized to a particular user language (e.g., English). A physical driver is attached to a particular identified environment (e.g. "Windows NT x86","Windows NT IA64") for which it has been compiled—and possibly a language for which it has been localized. The identified physical driver potentially includes a number of components (e.g., HP LaserJet 4 customization, sRGB profile and Unidrv). It is noted that not all components have a dependency on a particular environment (e.g., Image Color Management (ICM) profiles, or a GPD (generic printer description)).

The entries of the LogicalDrivers table 660 include a driver name, a manufacturer ID, a plug-n-play ID, a version, and a providerID. The manufacturer ID, in turn, references entries within a Manufacturers table 670. The fields of the Manufacturers table 670 include, by way of example, a name field and a URL field.

The metadata store 304 database, in an embodiment of the invention, is created at first boot of a service that provides the driver storage. In an embodiment of the invention, a print spooler provides such service. In other instances a dedicated driver management service is used. The metadata store 304 database is populated from the contents of INFs provided along with a copy of the operating system. Alternatively, a pre-filled database is loaded into the build—at the expense of complicating the build process (as the information in the database is redundant to the information in the INFs, it would have to be a new post-build step).

With regard to the packages table, as explained above, the PackageID (provided by the INF of a package) cannot be reliably used to distinguish between two versions of a substantially same package because the PackageID does not, as a rule, change with every change in the whole package (as long as the INF does not change). Instead, a PackageID set by the INF does not change (between versions) once a package is created. Thus, a DriverVer entry stored in the package is used to distinguish between two versions of a package having identical PackageID values.

Figure 7:
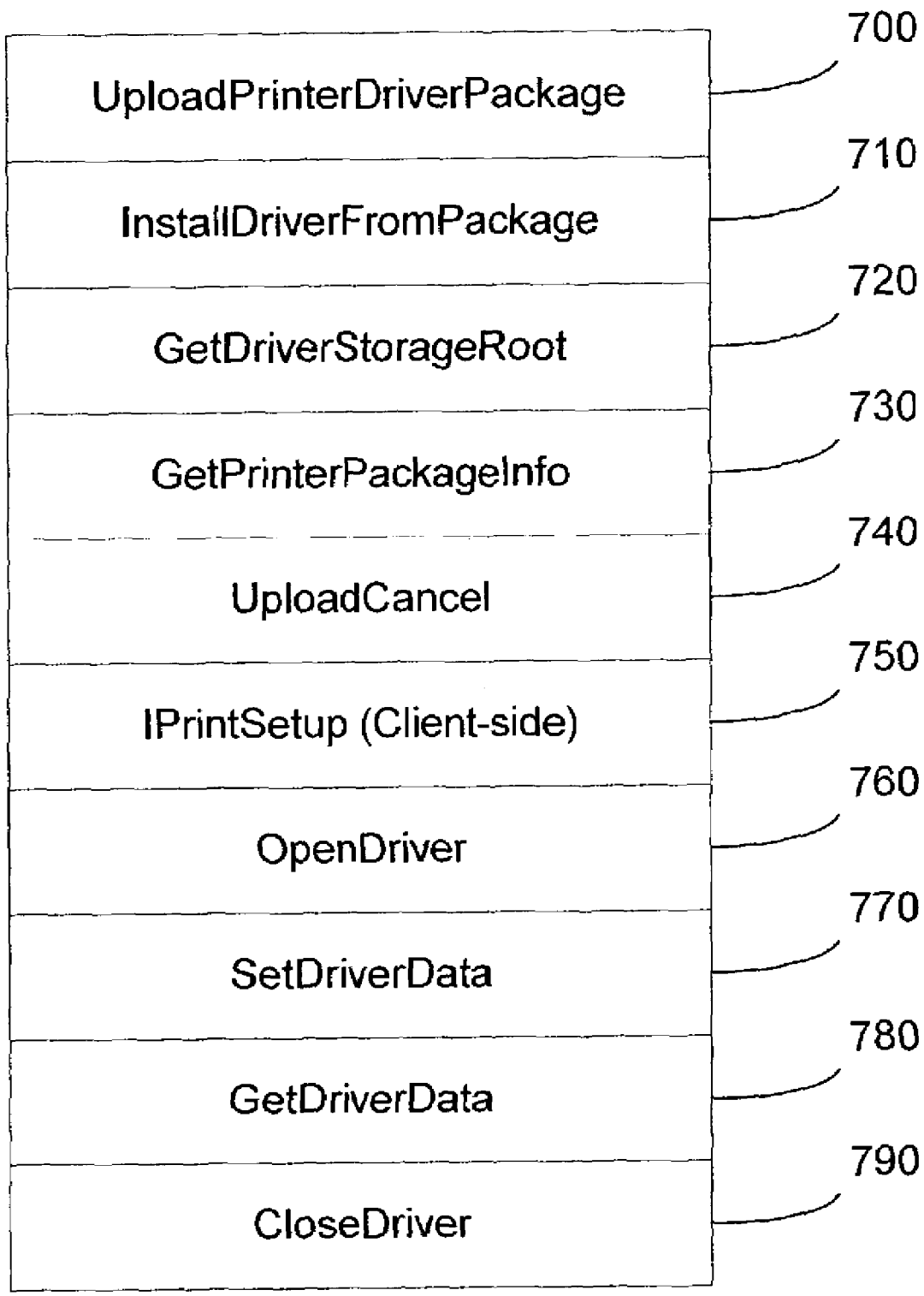
FIG. 7 is an exemplary set of methods/functions supported by a print spooler for a client embodying the present invention.

Having described the underlying organization of a peripheral device driver maintenance facility for use by clients in a network environment, attention is directed to the functional interfaces of the system and exemplary methods that are performed using the underlying framework described herein. Turning initially to FIG. 7, a set of exemplary (printer driver-related) application program interfaces (APIs) are identified for loading/installing packages and drivers. The APIs are implemented using, by way of example, a remote procedure call helper library. As a consequence the functions need not be implemented by all the peripheral device providers.

UploadPrinterDriverPackage () API 700

An UploadPrinterDriverPackage API 700 facilitates uploading printer driver packages. The UploadPrinterDriverPackage API 700 is an asynchronous API. The following is an exemplary form of the UploadPrinterDriverPackage API 700.

```
HRESULT
UploadPrinterDriverPackage(
    IN LPCTSTR              pszServer,
    IN LPCTSTR              pszINFPath,
    IN DWORD                dwFlags,
    IN HANDLE               hEvent,
    OUT HRESULT*            pError,
    OUT DWORD*              pdwCancelId,
    OUT PDDRIVER_PACKAGE_ID pPackageId
);
```

Where the following characterizes the recited parameters:

pszServer is the full name of the server where the package should be uploaded. If the server is in a cluster then this parameter should start with the cluster name.

pszINFPath is the full path and name of an INF file which is processed to generate a printer driver package. The processing of the INF takes place at the client side to avoid the problems arising if the INF file is not accessible from the server—such as when the INF file is on a CD, and the CD reader is not shared out on the client machine. The INF file is parsed and a list of all files referenced are prepared. Each file is presented into the list with a full path. The list is sent to the server and the corresponding files are uploaded there. The location for uploading the package on the server is found by reading the DriverStorageShareName value of the following registry key on the server:

SYSTEM\\CurrentControlSet\\Control\\Print\\Driver
   StorageRoot—which can be configured, by way of example, through a user interface by a print server administrator.

As explained previously above, each package is assigned to a uniquely labeled subdirectory. In the exemplary embodiment of the invention, a GUID is generated for the uploaded package, and the package GUID is used to create a directory name under the DriverStorageShareName. Under that directory a subdirectory is created that has the following format: YYYYMMDD where YYYY, MM, and DD are the year, month, and date of the current version of the package. All package files are copied under that subdirectory. The directory structure of the package tree is directed by a structure provided by the package's INF file.

dwFlags provides a mechanism for modifying the behavior of the API. For example if the value of dwFlags equals to 0×01, then if the package already exists on the server it will be overwritten/replaced during the upload. The dwflags parameter also sets the platform for the package.

hEvent is an event handler provided by the caller. The corresponding event is signaled when the upload job is done. If hEvent is NULL then the call is transformed to a synchronous one.

pError is a pointer to an HRESULT which is where the value returned from the asynchronous call is written. That value will be valid after hEvent has been signaled.

pdwCancelId is a pointer to a DWORD value that can be used to cancel the asynchronous UploadPrinterDriverPackage via a call to an UploadCancel API (discussed herein below). The value of pdwCancelId is valid immediately after UploadPrinterDriverPackage has returned.

pPackageId is a pointer to a PackageId structure of the following type:

```
typedef struct _DRIVER_PACKAGE_ID
{
    DWORD       dwSize;
    GUID        DPackageGuid;
    SYSTEMTIME  DPackageTime;
} DRIVER_PACKAGE_ID, *PDDRIVER_PACKAGE_ID;
```

When the asynchronous call is complete the structure to which it points will contain the GUID and the time of the package. The received DRIVER_PACKAGE_ID is used to label the package's subdirectory.

InstallDriverFromPackage() API 710

The InstallDriverFromPackage() API 710 installs a driver out of an installed package. The flags parameter specifies the type of driver to install (printer driver, port monitor, print processor etc.). The installation method updates the metadata store 304 and manifest information 504 to reflect the newly installed driver. To the extent the components of the installed driver are not yet present in the active driver store 302, new subdirectories are added and the new components are stored within the new component containers. The following is an exemplary form of the InstallDriverFromPackage API 710.

```
HRESULT
WINAPI
InstallPrinterDriverFromPackage(
    IN LPCTSTR            pszServer,
    IN DRIVER_PACKAGE_ID  PackageID,
    IN LPCTSTR            pszModelName,
    IN LPCTSTR            pszEnvironment,
    IN DWORD              dwVersion,
    IN DWORD              dwFlags
);
```

In the above-summarized API:

PszServer is specifies a name of a server. A value of NULL is used to install a driver from a local package store. It is noted that, in an embodiment of the invention, the driver package has been previously installed with the UploadPrinterDriverPackage API 700 on the machine defined by the identified pszServer.

PackageID defines the installed package from which we want to install the printer driver. The value for PackageID is returned by the UploadPrinterDriverPackage API 700.

PszModelName is the name of the printer driver. The identified printer driver must exist in the package defined by PackageID.

PszEnvironment is the environment on which the driver is to be installed. In an embodiment of the invention string names are used. Examples of such strings include: "Windows NT x86", "Windows IA64" and "Windows NT AMD64".

DwVersion specifies a version of the driver to be installed.

DwFlags facilitates specifying customizations to the default behavior of the API.

Exemplary flags can be derived from the well known AddPrinterDriver API counterpart, and include:
IDFP_STRICT_UPGRADE
IDFP_STRICT_DOWNGRADE
IDFP_COPY_ALL_FILES
IDFP_COPY_NEW_FILES
IDFP_DONT_COPY_FILES_TO_CLUSTER
IDFP_COPY_TO_ALL_SPOOLERS
IDFP_NO_UI
IDFP_INSTALL_WARNED_DRIVER Some flags in AddPrinterDriver have no counterpart in the InstallDriverFromPackage API 710. These are:
APD_COPY_FROM_DIRECTORY—which is not needed since we don't pass a DRIVER_INFO_6 structure.
APD_RETURN_BLOCKING_STATUS_CODE—since this API always returns blocking code, because no down level clients call this function.
APD_DONT_SET_CHECKPOINT—since this API always sets a checkpoint if installation of an unsigned driver is attempted.

In an embodiment of the invention the set of flags include ones giving the caller greater control over what components to install from the INF. These flags include:
IDFP_INSTALL_PRINTER_DRIVER
IDFP_INSTALL_LANG_MONITOR
IDFP_INSTALL_PRINT_PROC
IDFP_INSTALL_ICM_PROFILE
IDFP_INSTALL_ASP_PAGES Unsigned drivers are handled by the InstallDriverFromPackage API 710 as follows:
If the installation happens remotely, it fails.
If the user is not an administrator, it fails.
If the user is an admin, the installation is re-tried within the user's context, similar to what PnP does with server-side/client-side installation GetDriverStorageRoot 720

The GetDriverStorageRoot 720 function is called to find the root location where a server stores the driver packages of the driver package store 300. The package store root location, in an embodiment of the invention is typically set by an administrator. The form of the GetDriverStorageRoot 720 function is, by way of example, as follows:

```
HRESULT
GetDriverStorageRoot(
    IN      LPCTSTR   pszServer,
    OUT     LPTSTR*   ppDStorageRootBuffer
);
``` pszServer is the full name of the server where the driver package store 300 resides. If the server is in a cluster, then the full name starts with the cluster's name.

ppDStorageRootBuffer is a pointer to a pointer where the address of the buffer, containing the path to the driver storage root, is to be written. In an embodiment of the invention, the path is zero terminated. The memory for that buffer is allocated by the API. The caller is responsible for freeing the buffer via a call to a LocalFree API.

GetPrinterPackageInfo 730

The GetPrinterPackageInfo 730 function enables a client to request enumeration of package information. The following is an exemplary form of the GetPrinterPackageInfo 730 function:

```
HRESULT
GetPrinterPackageInfo (
    [in,string,unique] LPCTSTR      pszServerName,
    [in]        PQUERY_CONTAINER    pQueryContainer,
    [out]       DWORD               *pcGUIDs, //GUID count
    [out]       GUID                **ppGuidArray,
    [out]       SYSTEMTIME          **ppVersionArray
);
```

UploadCancel 740

The UploadCancel 740 function cancels a previously invoked asynchronous call to the UploadPrinterDriverPackage API 700. The following is an exemplary form of the UploadCancel 740 function:

```
HRESULT
WINAPI
UploadCancel(
    IN    DWORD      dwCancelId
);
``` dwCancelId is the identifier returned by the call to UploadPrinterDriverPackage API 700 that is to be cancelled. The valid values of the dwCancelId parameter are positive. The UploadCancel 740 function returns S_OK if the asynchronous call can be canceled. In this case the UploadPrinterDriverPackage API 700 cleans up and then signals the corresponding event. If the asynchronous API cannot be canceled or if the value of dwCancelId is not valid, then the UploadCancel 740 function will return E_FAIL.

IPrintSetup 750

In an embodiment of the invention, the IPrintSetup 750 interface exposes all the new interfaces to users in a single COM interface that is served from, for example a spooler drivers (e.g., Winspool.drv). The IPrintSetup 750 interface is a wrapper around all the new functions.

OpenDriver() 760

The OpenDriver() 760 function establishes a handle for each driver. The following is an exemplary form of the OpenDriver() 760 function. The data structures are initially presented. Thereafter, an exemplary method format is summarized.

```
struct LOGICAL_DRIVER_ID
{
    GUID    ModelProvGuid;
    HYPER   Version; // HYPER is the IDL type for 64 bit signed integer
}
enum eEnvironment
{
    EnvX86,
    EnvIA64,
    EnvAMD64,
    EnvAlpha,
```

```
    EnvWin9x
}
struct PHYSICAL_DRIVER_ID
{
    LOGICAL_DRIVER_ID   LogDriver;
    eEnvironment        Env;
    DWORD               cVersion;
    LANGID              LanguageId;
}
struct DRIVER_OPTIONS
{
    DWORD   cbSize;
    DWORD   dwFlags;
}
HRESULT
OpenDriver(
    IN           PCTSTR              pszServerName,
    IN           PHYSICAL_DRIVER_ID  *pDriver,
    IN OPTIONAL  DRIVER_OPTIONS      *pOptions,
    OUT          HANDLE              *pHandle
);
```

SetDriver() 770

The SetDriver() 770 function facilitates setting particular parameters associated with a driver. An exemplary SetDriver() 770 function has the following form:

```
    HRESULT
    SetDriverData(
        [in] HANDLE  hDriver,
        [in] PTSTR   pszDataName,
        [in] DWORD   BufSize,
        [in] VOID    *pBuf
    );
```

GetDriverData() 780

The GetDriverData() 770 function enables retrieving particular parameters associated with a driver. An exemplary GetDriverData() 780 function has the following form:

```
    HRESULT
    GetDriverData(
        [in] HANDLE   hDriver,
        [in] PTSTR    pszDataName,
        [in] DWORD    BufSize,
        [OUT] VOID    *pBuf,
        [OUT] DWORD   *pReqBufSize
    );
```

CloseDriver() 790

The CloseDriver() 790 function enables releasing a previously opened driver, thereby inactivating the client on the particular client upon which the driver is installed. An exemplary CloseDriver() 790 function has the following form:

```
    HRESULT
    CloseDriver(
        [in] HANDLE hDriver
    ).
```

Figure 8:
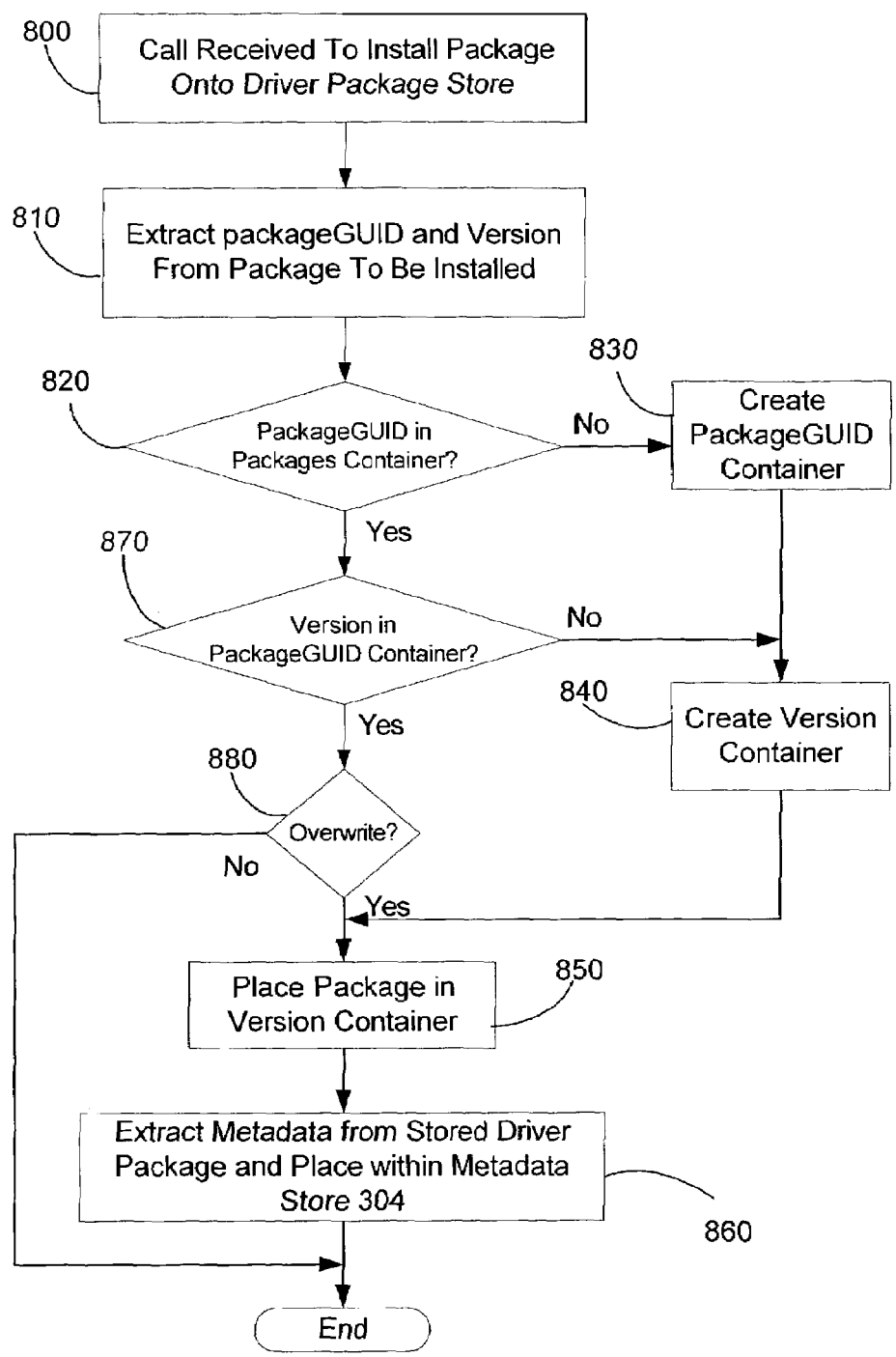
FIG. 8 is a flowchart summarizing a set of steps for installing a package within a driver package store.

Turning to FIG. 8, a set of steps are summarized for installing a package (e.g., a printer driver package) into a computer system's driver package store 300 having, for example, a logical structure of the type generally depicted in FIG. 4. As explained above, when a package is installed, rather than install only select portions of the package, the entire package is installed on a particular package container. Initially, during step 800 a computer system that maintains the driver package store 300 receives a call (e.g., UploadPrinterDriverPackage 700) to install the complete target package onto the driver package store 300. In response, during step 810 the installer extracts distinguishing information the from the package to be installed. In an embodiment of the invention, during step 810 the installer reads a packageGUID and a version from the INF file within the package of to be installed into the driver package store 300.

Next, during step 820 the installer accesses the driver packages container 450 and determines whether the packageGUID extracted during step 810 is present, as one of the packages GUID container names within the driver packages container 450. If the extracted packageGUID is not present, then control passes to step 830 wherein a new packages GUID container is created and assigned the extracted packageGUID. Thus, in the exemplary embodiment of the invention a packages GUID container holds all package versions having a same packageGUID. Control then passes to step 840.

At step 840 a version container is created to hold the particular version of the driver package. In an embodiment of the invention the version container is labeled according to the version extracted during step 810. By way of example, the version is a date assigned to the driver package or a more formalized version name comprising multiple, concatenated alphanumeric values designating major releases, sub-releases, and bug-fix releases. In a particular embodiment, the version is comprises four bytes of granularity.

After creating a new version container to hold the package, during step 850 the package is stored within the new version container. The form of the stored package varies according to alternative embodiments of the invention. However, in a particular embodiment, during step 850 the driver files are extracted from the installed raw package's CAB file. Such extraction of driver files in at least some instances includes decompressing the files. Containers/subdirectories are created, in accordance with the assemblies defined by the INF file for the installed package, that store the extracted drivers at file system locations (e.g., sub-directories) determined at a first level by model and provider GUID (MPG) and then at a second level by version. The version is, by way of example, designated by a date or a segmented sequence of characters—in a manner analogous to storing package versions. Alternatively, the drivers are stored in containers identified by strong name.

As represented at step 860 of FIG. 8, after storing the files in the directory structure of the driver package store 300, metadata describing the stored packages, including their drivers, is added to the metadata store 304 database. Maintaining such a database facilitates relatively faster searches of the file contents of the centralized driver store 300. It is noted that step 860 does not really depend upon any particular previous steps, and therefore can occur at any time in association with the installation of a driver package. However, by waiting until the package is indeed installed on the driver package store 300, the accuracy of the contents of the metadata store is assured. Control then passes to the END.

Returning to step 820, if the extracted packageGUID is identified in the driver packages container 450 (indicating a match to an existing packages GUID container), then control passes to step 870. At step 870 the package version (strong name) is compared to existing package versions. If the extracted package version does not match a package version identified within the packages GUID container, then this particular version of the identified package does not yet exist in the driver package store 300 and control passes to step 840. On the other hand, at step 870, if the extracted package version matches a package version identified within the packages GUID container, then this particular version of the package already exists in the driver package store 300, and control passes to step 880.

During step 880, the installer is provided the option of overwriting the current, supposedly identical version of the driver. If overwriting is desired, then control passes to step 850 and the previously existing version of the package under the matching package version container label is replaced. If overwriting is not desired, then control passes to the END. It is noted in closing that the above-described package installation method is exemplary of a process for storing packages in a manner that facilitates distinguishing between versions of packages and versions of the drivers within the packages. Those skilled in the art will readily appreciate, in view of the disclosure contained herein, that the steps can be modified and re-arranged while still maintaining the capability to distinguish between installed versions.

Figure 9:
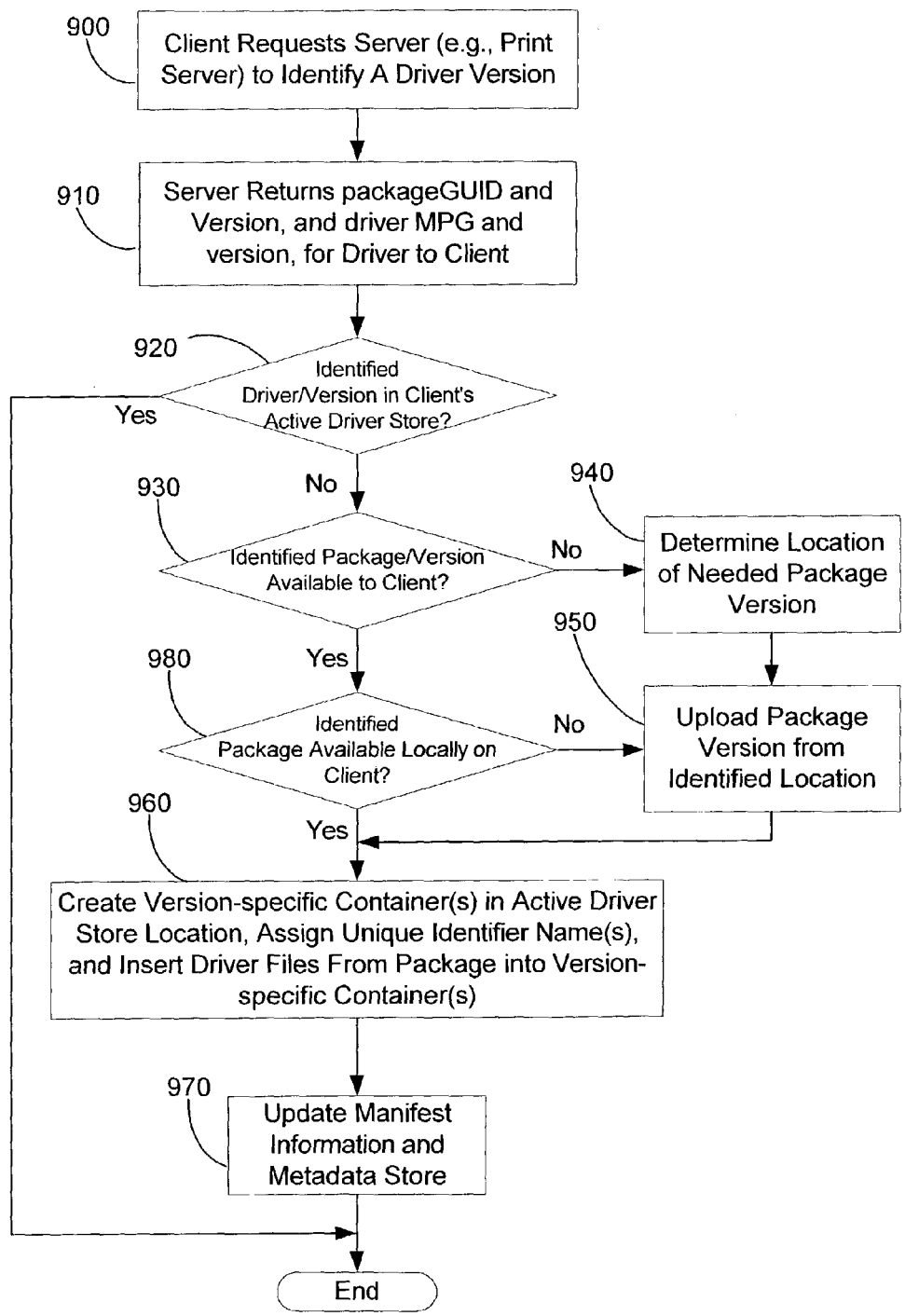
FIG. 9 is a flowchart summarizing a set of steps for maintaining proper driver versions on a client machine for a particular server.

Turning to FIG. 9, a set of steps are summarized for a client and server establishing compatible drivers for a networked peripheral device. In the exemplary steps, the client installs a driver into the client computer system's active driver store 302 from the driver package store 300 in a manner such that differing versions of a driver are maintained separately. Each driver version is associated with a list of uniquely identified components (e.g., a manifest) stored in the active driver store 302. A manifest is stored in the active driver store 302 for each uniquely identified component. Furthermore, each driver manifest/list is stored within an entry, corresponding to a particular driver version, in the PhysicalDrivers table 650 of the metadata store 304 maintained on the client.

There are a number of ways contemplated for simultaneously supporting multiple, separate, versions of a same driver including differing files having a same name. Such separation is achieved in an embodiment of the invention by storing all components/files of each active driver version in a uniquely identified file system container (e.g., sub-directory). However, particular driver components (e.g., unidriver) are used by many drivers, and maintaining a copy for each driver/version combination would be a waste of memory space. Thus, other embodiments of the invention store less than a complete set of files for a particular driver in a uniquely identified subdirectory container. Instead, a complete driver is created from components stored within multiple subdirectories of the active driver store 302. A complete driver is constructed based upon the contents of a manifest for the driver in the metadata store 304.

The level of consolidation of files/components in a particular subdirectory differs in accordance with various embodiments of the invention. In one embodiment, each component version, comprising one or more files, is assigned to a sub-directory in the active driver store 302. In yet another embodiment a uniquely identified subdirectory is established for each driver version, and the subdirectory contains non-shared components/files associated with that particular driver version. Shared components of the driver version are contained in other locations of the active driver store 302.

In a particular embodiment of the invention, the sub-directories containing the driver files are stored under a generalized directory that stores groups of related software modules, including application software. The unique identifier name (e.g., strong name) assigned to each sub-directory is thereafter provided, through a component manifest stored in the manifest information 504 or the metadata store 304 manifest for a particular driver version, to client software that relies upon the driver files for a particular driver version. Furthermore, in a embodiment of the invention, the sub-directories containing the various groupings of driver files are made available for other machines to read and download drivers from the client machine—referred to as "shared out" directories. The set of steps described below (for a networked printer driver) assume that, a client and a server to which the client seeks establishing a connection, both support the package and driver version distinguishing capabilities described above.

During step 900 a client machine requests identification of a particular device driver from a print server. The request is, by way of example, a GetPrinterDriver or GetDriverData call. Next, at step 910 the print server returns, to the requesting client, driver identification information sufficient to locate a particular driver version in the driver file system structure maintain by the driver package store 300. In a particular embodiment of the invention, the print server returns a packageGUID and version, and a driver MPG and version. In the exemplary embodiment of the invention, this information is sufficient to specify a driver version within the metadata store 304, the active driver store 302, or the driver package store 300 file system. Also, the MPG and version are sufficient to enable the requesting client to determine, by accessing the metadata store 304 or the active driver store 302 (that also contains the driver versions and associated manifests), whether the needed print driver is already in the client machine's active driver store 302.

Upon receiving the identification information, during step 920 the client machine determines whether the identified driver version (e.g., MPG and version) is already within its active driver store 302. If the identified driver version in the server's response is within the client's active driver store 320, then the client has the necessary driver components to carry out fully compatible interactions with the server, and therefore control passes to the End. However, if the identified driver is not present, then control passes from step 920 to step 930 wherein the client machine determines whether the identified packageGUID and version are available at a known location (either locally or on some known shared out location on another machine such as the central driver store 212). If the identified packageGUID and version does not correspond to a package available to the client, then control passes to step 940.

At step 940 the client machine determines the location of the identified package and version in the network. In an exemplary embodiment of the invention, the client machine issues a request to the driver package store 300. The driver package store 300 is, for example, provided by a service on a print server (or the central driver store 212) that maintains a listing of all the driver packages and their respective locations (identified by share names). Thus, during step 940, the driver package store 300 returns, by way of example, a \\ server \ share name that is used by the client to request a copy of the package version identified during step 910. It is noted that the present example utilizes identification of a package version rather than a driver version. However, in an alternative embodiment of the invention, where driver versions are shared out, the clients are capable of requesting the location for a particular driver version. Upon receiving the requested network location, control then passes to step 950.

During step 950 the client requests uploading the identified version of the package from the known location of the package (or alternatively driver) version. The upload request includes, by way of example, the server name, share name, packageGUID and version. Upon receiving the requested driver package version, the client machine installs the package within its local driver package store 300 according to the steps described, by way of example, with reference to FIG. 8. Control then passes to step 960.

During step 960, the client machine invokes a method/function to install the driver version, identified during step 910, from the package store 300 into the active driver store 302. During step 960 one or more new sub-directory containers are created in the active driver store 302, for storing components of the installed driver version, the new subdirectories are provided unique identifier names (e.g., the MPG and version), the driver files corresponding to the driver/components versions of the driver version, identified during step 910, are copied from the package into the new sub-directories. Thereafter, control passes to step 970 wherein the manifest information 504 of the active driver store 302 is updated to include any new manifests associated with the newly installed driver version (including a new file storing a driver manifest listing the components making up the new driver version), and, in an embodiment of the invention, a new entry is created in the metadata store 304 corresponding to the new active driver. The new entry/manifest information includes a driver manifest listing, by unique identifier name, the components in the active driver store 302 that make up the newly installed driver version. By creating a new manifest information/driver entry in, for example, the metadata store 304 for each new driver version and storing different versions of driver components/files within uniquely identified subdirectories, the above-described method avoids overwriting any driver files containing a same name, but different content (e.g. versions of a same driver file). Control then passes from step 970 to the End.

Returning to step 930, if the identified package is available to the client (either locally or on a known file share), then control passes to step 980. During step 980, if the package version is not locally stored, then control passes to step 950 described above. Otherwise, if the package is available locally, then control passes to step 960 and the driver version identified during step 910 is installed in the client's active driver store 302.

Figure 10:
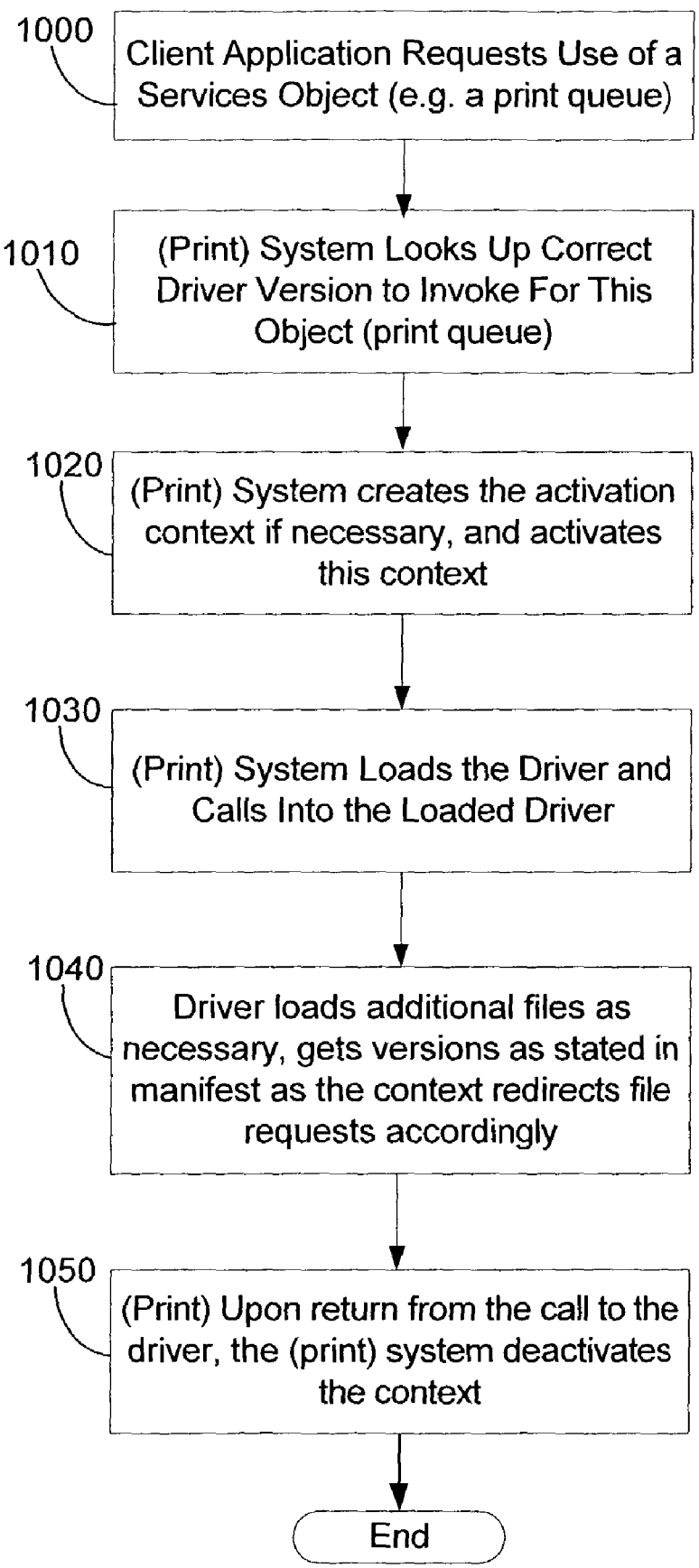
FIG. 10 is a flowchart summarizing how a client accesses the driver version in the course of interacting with a server.

Having described how driver versions are identified and stored in an active driver store 302, a set of steps are summarized in FIG. 10 for a print client accessing a particular driver version from the active driver store 302 to interact with a particular print server that operates using a known driver version that is currently stored in the client's active driver store 302.

Initially, during step 1000 a client application requests use of a services object, such as, for example, a print queue for a printer supported by a particular print server. For a print queue, such a request might be for the printable area of the printer that is driven by the print queue, this kind of data is supplied through a wrapper layer (which is part of the operating system and it's API) from the print driver. Such request is initiated, for example, by a print request by a word processing application. Next, during step 1010 the operating system looks up the correct driver version required for the particular print queue (the print driver version currently being used by the print server associated with the current queue). This can be accomplished in any of a number of known ways to determine required printer drivers for a queue. The exemplary embodiment builds upon the prior known versions by determining the version of the driver in addition to the general identification of the driver itself.

Next, during step 1020, the print system creates an activation context from the manifest of the driver for running the particular driver version. The activation context provides a search path for the operating system to access driver component versions in accordance with the uniquely identified driver version. The context guides the order of locations for searching out components of the identified driver version. Thus, if an application (in this example the print subsystem of the operating system) requests Unidrv without specifying a version (in other words, if it doesn't specify a strong name, just a part of it), the activation context provides the information that leads to loading a particular version. Providing a context enables switching an application from one driver component to another (e.g. to an updated version of a shared component) by merely switching the driver manifest from which the context is derived. Thus, in summary activating a context corresponds to activating a particular search path associated with the particular driver version.

After creating the activation context, during step 1030 the system loads the driver components associated with the particular driver version based upon the activated context, and then calls into the driver to carry out a command/operation associated with the particular driver version.

Next, during step 1040, the driver may load additional files (e.g., configuration files, helper DLLs). If it does so, it gets the versions of those components according to locations/paths specified in the driver manifest. In an embodiment of the invention, a component of a driver can also include a manifest defining additional driver files/components. These additional files are also identified by version information in addition to a GUID that enables a particular driver version to be carried out on a client machine to match a version on a server machine. The versions are governed by the currently activated context (driven by the manifests of the driver and its components).

Finally, during step 1050, after completing the request submitted to the driver, the print system deactivates the context and control passes to the End. It is noted while the present example was given with reference to network print drivers, the present invention is applicable to other shared networked peripheral devices including, fax machines, scanners, etc.

It will be appreciated by those skilled in the art that a new and useful method and system has been described for maintaining peripheral device drivers and their constituent components in a networked peripheral device environment. In view of the many possible environments to which the principles of this invention may be applied and the flexibility of designing and carrying out software utilities and tools, it should be recognized that the embodiments described herein are meant to be illustrative and should not be taken as limiting the scope of invention. Those skilled in the art to which the present invention applies will appreciate that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A method for maintaining components of multiple simultaneously active networked peripheral device drivers, on a networked machine, wherein differing components of the simultaneously active networked peripheral device drivers potentially comprise differing peripheral device driver files bearing a same name, the method comprising:

requesting driver identification information for a peripheral device queue for a networked peripheral device, wherein the driver identification information is maintained by a server;

receiving, in response to the requesting, a driver identification specifying a particular driver package, a package version, and a particular version of a networked peripheral device driver, wherein the version comprises an encoded, multi-segmented value;

comparing the driver identification to a set of active driver packages' package versions, and active driver versions currently maintained by the networked machine;

determining that the set of device drivers does not comprise the driver package, package version, and driver version corresponding to the driver identification;

issuing a query comprising the driver package identification to a repository of device driver components;

obtaining a copy of a complete set of device driver files corresponding to the particular package, particular package version, and particular version of the networked peripheral device driver from the repository of device driver components;

providing an active driver component storage that holds containers for active networked peripheral device driver components;

establishing a container for storing the set of driver files constituting a package, a package version, and a version of a networked peripheral device driver component, wherein the container is associated with the active device driver components of the networked machine;

assigning a unique identifier name to the container, wherein the unique identifier name comprises a package identification and a version identification of the device driver component; and inserting the set of driver files within the container.

2. The method of claim 1 wherein the container is a file system sub-directory.

3. The method of claim 1 wherein the version comprises a date.

4. A system for maintaining multiple simultaneously active networked peripheral device drivers, on a networked machine, wherein differing ones of the simultaneously active networked peripheral device drivers potentially contain differing peripheral device driver files bearing a same name, the system comprising:

at least one memory;

at least one processor;

means for requesting driver identification information for a peripheral device queue maintained by a server for a networked peripheral device;

means for receiving, in response to the means for requesting, a driver identification specifying a particular version, a particular package, and a particular package of a networked peripheral device driver, wherein the version comprises an encoded, multi-segmented value;

means for comparing the driver identification to a set of driver versions, package versions, and active driver packages currently maintained for use by the networked machine;

means for determining that the set of driver versions, package versions, and driver packages does not comprise the driver version, package version, and driver package corresponding to the driver identification;

means for issuing a query comprising the driver package identification to a networked directory of driver packages and peripheral device driver components;

means for obtaining a copy of the set of device driver files corresponding to the driver version, the package version, and driver package of the driver identification from the networked directory of driver packages and peripheral device driver components;

means for providing an active driver component storage that holds containers for active networked peripheral device driver components;

means for establishing a container for storing the set of driver files constituting a version, a package version, and a package of a networked peripheral device driver component, wherein the container is associated with the active device driver components of the networked machine;

means for assigning a unique identifier name to the container, wherein the unique identifier name comprises a package identification and a version identification of the device driver component; and means for storing the set of driver files in the container.

5. The system of claim 4 wherein the container is a file system sub-directory.

6. The system of claim 4 wherein the version comprises a date.

7. The system of claim 4 wherein the means for obtaining obtains a complete copy of a driver package version containing the copy of the driver version.

8. A computer-readable storage medium comprising instructions, that when executed by a computer, cause the computer to perform a method for facilitating maintaining components of multiple simultaneously active networked peripheral device drivers, on a networked machine, wherein differing components of the simultaneously active networked peripheral device drivers potentially contain differing peripheral device driver files bearing a same name, the method comprising:

requesting driver identification information for a peripheral device queue maintained for a networked peripheral device, wherein the driver identification information is maintained by a server;

receiving, in response to the requesting step, a driver identification specifying a particular version, a particular package version, and a particular package of a networked peripheral device driver, wherein the version comprises an encoded, multi-segmented value;

comparing the driver identification to an active set of driver versions, package versions, and active driver packages currently maintained in a networked repository available to the networked machine;

determining that the set of driver versions does not comprise the driver version corresponding to the driver identification;

issuing a query comprising the driver package identification to the networked repository; obtaining a copy of a complete set of device driver files corresponding to the driver version, package version, and driver package not included in the active set of driver versions, active package versions, and active driver packages available to the networked machine;

providing an active driver component storage that holds containers for active networked peripheral device driver components;

establishing a container for storing a set of driver files constituting a version of a networked peripheral device driver component, wherein the container is associated with the active device driver components of the networked machine;

assigning a unique identifier name to the container, wherein the unique identifier name comprises a version identification and a package identification of the device driver component; and inserting the set of driver files within the container.

9. The computer-readable storage medium of claim 8 wherein the container is a file system sub-directory.

10. The computer-readable storage medium of claim 8 wherein the version comprises a date.

11. The computer-readable storage medium of claim 8 wherein the obtaining comprises obtaining a complete copy of a driver package version containing the copy of the driver version.

* * * * *